June 29, 1965  G. CHIEGER  3,191,985
MEAT RAIL SUPPORT BEAM FOR REFRIGERATED TRUCKS
Filed Oct. 9, 1963
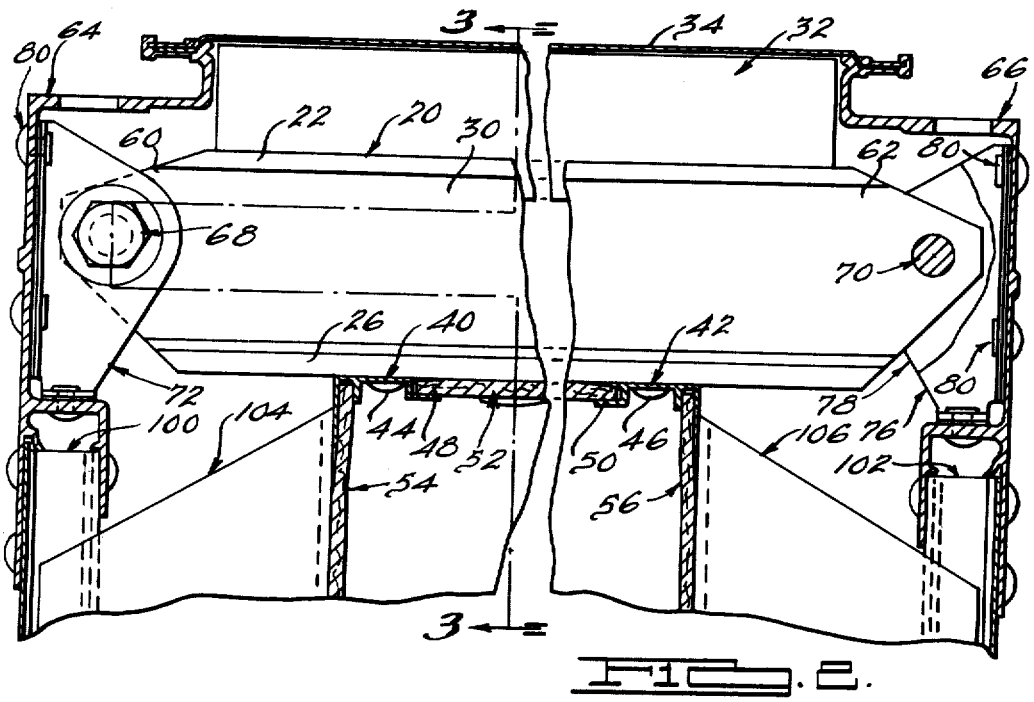
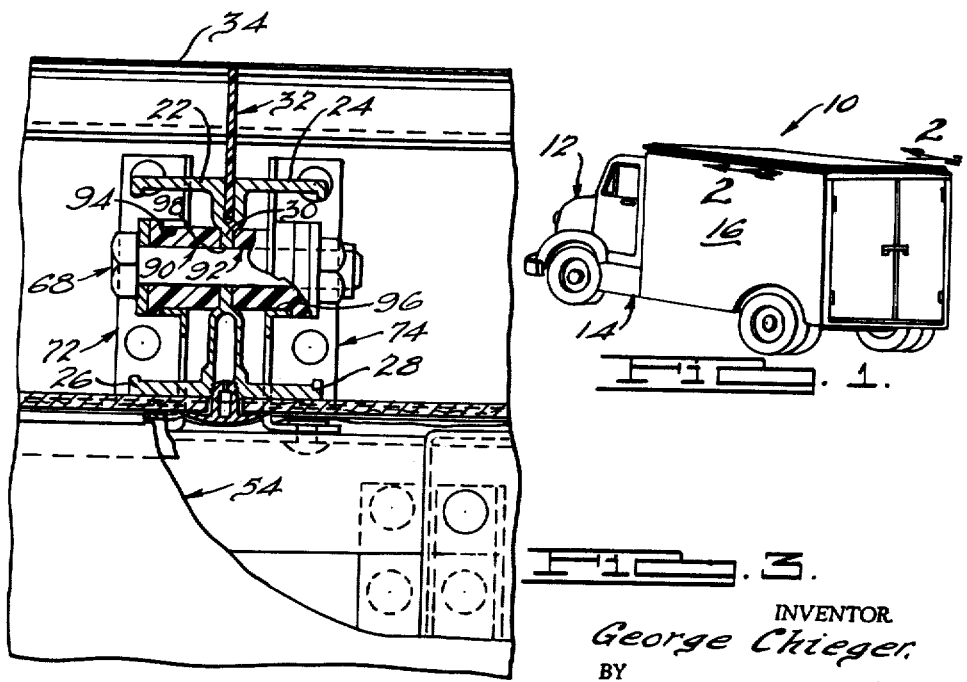
INVENTOR.
George Chieger,
BY
Harness, Dickey & Pierce
ATTORNEYS United States Patent Office 3,191,985
Patented June 29, 1965

3,191,985
MEAT RAIL SUPPORT BEAM FOR REFRIGERATED TRUCKS
George Chieger, Birmingham, Mich., assignor to Fruehauf Corporation, Detroit, Mich., a corporation of Michigan
Filed Oct. 9, 1963, Ser. No. 315,067
2 Claims. (Cl. 296—28)

This invention relates generally to trailer constructions, and more particularly to an improved construction for a meat rail support beam for refrigerated trucks, trailers or the like.

There has long been a need in the over-the-road transportation industry for a thoroughly engineered refrigerated truck and trailer construction that recognizes the particular problems faced incident to the hauling of sides of beef or other refrigerated loads that are normally suspended from the ceiling of the truck or the trailer. One such problem in currently known and used refrigerated trucks is that when relatively heavy loads are suspended from the ceiling of a truck or trailer, large bending moments are transferred to the side walls of the truck. Such a bending moment requires that the side walls of the truck be relatively heavily constructed and therefore expensive.

Accordingly, one object of the instant invention is a construction for refrigerated trucks and trailers wherein bending moments transferred to the side walls thereof due to loads suspended from the ceiling of the truck are minimized.

Another problem associated with the use of refrigerated trucks and trailers is excessive heat transfer from the roof and side walls of the trailer to the internal walls and load supporting roof beams thereof. Obviously, the roof and wall panels of such vehicles are often directly exposed to the sun resulting in relatively high outer skin temperatures. However, in accordance with one feature of the instant invention, transfer of relatively high temperatures on the outer skin surfaces of the truck or trailer to the inner walls thereof is minimized.

Thus, another object is an improved construction for refrigerated trucks that minimizes heat transfer between the skin of the outer roof and side walls of the truck or the trailer and the interior thereof.

Other objects and advantages of the instant invention will become apparent in the following specification, claims and drawings, wherein:

FIGURE 1 is a perspective view of a van-type truck having the improved construction of the instant invention;

FIG. 2 is a cross sectional view taken substantially along the line 2—2 of FIGURE 1, and FIG. 3 is a cross sectional view taken substantially along the line 3—3 of FIGURE 2.

As seen in FIGURE 1 of the drawings, a trailer construction in accordance with the instant invention is shown applied to a refrigerated truck 10 having a conventional cab 12, frame 14 and insulated van 16.

In accordance with the instant invention and as best seen in FIG. 2, a meat rail support beam 20 extends laterally of the van 16 at the upper extremity thereof for the support of conventional hangers (not shown). The beam 20 is of I-shaped cross section defined by upper flanges 22 and 24, lower flanges 26 and 28 and a vertically extending web portion 30. A vertically extending roof support plate 32, of insulating material, for example, fiber glass, is disposed between the flanges 22 and 24 of the beam 20 for the support of a roof skin 34.

A pair of longitudinally extending extrusions 40 and 42 are secured to the lower flanges 26 and 28 of the beam 20 as by rivets 44 and 46 for the support of lateral edge portions 48 and 50 of a ceiling panel 52, and opposite side wall panels 54 and 56, respectively.

Opposite end portions 60 and 62 of the beam 20 are pinned to their related side walls 64 and 66, respectively, by a pair of longitudinally extending pins 68 and 70, respectively. The pins 68 and 70 extend through spaced beam support plates 72 and 74 on the side wall 64, and plates 76 and 78 on the side wall 66, the plates 72, 74, 76 and 78 being secured to the side walls 64 and 66 as by a plurality of rivets 80. It is to be noted that the pins 68 and 70 are substantially vertically aligned with the side walls 64 and 66 so that loads supported on the beam 20 are transferred to the walls 64 and 66 in compression substantially devoid of a bending moment.

As best seen in FIGURE 3 of the drawings, the pin 68, which is typical of the pin 70 as well, is supported in a pair of nylon bushings 90 and 92 which are accepted in complementary apertures 94 and 96 in the plates 72 and 74, respectively. The pin 68 extends through a complementary aperture 98 in the web portion 30 of the beam 20.

The side walls 64 and 66 are formed from a plurality of upstanding vertical posts 100 and 102, respectively, having laterally inwardly extending plate-like insulating members 104 and 106, respectively, which position and support the inner vertical wall liners 54 and 56, respectively. Thus, there is no metal to metal connection between the outer and inner walls of the van 16, the beam 20 in particular being thermally isolated from the side walls 64 and 66.

From the foregoing description it should be apparent that the trailer construction of the instant invention solves the aforementioned problems with respect to load transfer and thermal isolation of the external surfaces of the trailer from the internal walls thereof to a heretofore unknown degree. These problems are solved by the fact that the transversely extending load supporting beams of the van are pinned to the side wall through insulating joints that minimize the transfer of both bending moments and heat.

The joints comprise a pair of plates that are secured to the side walls which journal a pair of insulating sleeves through which a roof beam pin extends. The roof beam is pivotable relative to the side walls about these pins. Furthermore, the inner wall and ceiling liners of the trailer van are supported by complementary retaining extrusions that are secured to the roof beams. Both the roof skin and the side wall skins are maintained in spaced relation to the inner ceiling liner and inner wall liners by insulating members. Thus, heat transfer from the outer surface of the vehicle to the inner walls thereof is minimized. The space between the outer skins and inner wall liners may be filled with insulating material, for example, foam, if desired.

It is to be understood that the specific construction of the improved trailer construction herein disclosed and described is presented for the purpose of explanation and illustration and is not intended to indicate the limits of the invention, the scope of which is defined by the following claims.

What is claimed is:

1. In a refrigerated truck, trailer or the like having laterally spaced vertical side walls with inner and outer faces, respectively the improvement comprising laterally inwardly extending roof beam support plates at the upper edges of said side walls having horizontal longitudinally extending apertures therein between the inner and outer faces of said side walls, respectively, a transverse load supporting roof beam extending between said support plates, and a pair of horizontal longitudinally extending pins at opposite ends of said beam extending through the apertures in said plates and through opposite ends of said beam, respectively, said pins being the sole connections between said beam and said side walls so as to pivotally secure said beam to said support plates whereby said beam is free to flex about said pins relative to said side walls without transferring a bending moment thereto.

2. In a refrigerated truck, trailer or the like having laterally spaced vertical side walls, the improvement comprising laterally inwardly extending roof beam support plates at the upper edges of said side walls having longitudinally extending apertures therein substantially vertically aligned with said side walls, respectively, insulating bushings in the apertures in said plates, respectively, a transverse load supporting roof beam extending between said support plates, a pair of horizontal longitudinally extending pins at opposite ends of said beam extending through the bushings in said plates, respectively, so as to thermally insulate and pivotally secure said beam to said support plates, said pins being the sole connections between said beam and said side walls whereby said beam is free to flex about said pins relative to said side walls without transferring a bending moment thereto.

References Cited by the Examiner
UNITED STATES PATENTS

| | | | |
|---|---|---|---|
| 1,294,457 | 2/19 | Hawk | 105—367 |
| 2,108,557 | 2/38 | Hamburch. | |

A. HARRY LEVY, *Primary Examiner.*